(12) United States Patent
Underwood et al.

(10) Patent No.: US 10,348,634 B2
(45) Date of Patent: Jul. 9, 2019

(54) TECHNOLOGIES FOR TRACKING OUT-OF-ORDER NETWORK PACKETS

(71) Applicant: Intel Corporation, Santa Clara, CA (US)

(72) Inventors: Keith D. Underwood, Powell, TN (US); Charles A Giefer, Seattle, WA (US); Bruce M. Pirie, Renton, WA (US); Karl P. Brummel, Chicago, IL (US)

(73) Assignee: Intel Corporation, Santa Clara, CA (US)

( * ) Notice: Subject to any disclaimer, the term of this patent is extended or adjusted under 35 U.S.C. 154(b) by 478 days.

(21) Appl. No.: 14/979,131

(22) Filed: Dec. 22, 2015

(65) Prior Publication Data

US 2017/0180265 A1    Jun. 22, 2017

(51) Int. Cl.
| | | |
|---|---|---|
| *H04L 12/801* | (2013.01) | |
| *H04L 12/807* | (2013.01) | |
| *H04L 29/12* | (2006.01) | |

(52) U.S. Cl.
CPC .............. *H04L 47/34* (2013.01); *H04L 47/27* (2013.01); *H04L 61/6095* (2013.01)

(58) Field of Classification Search
CPC ..... H04L 47/34; H04L 47/27; H04L 61/6095; H04L 49/552
See application file for complete search history.

(56) References Cited

U.S. PATENT DOCUMENTS

| | | |
|---|---|---|
| 5,151,899 A | 9/1992 | Thomas et al. |
| 7,852,846 B2 | 12/2010 | Favor et al. |
| 7,912,060 B1 * | 3/2011 | Chen ................. H04L 47/27 370/229 |
| 7,957,288 B2 | 6/2011 | Georgiou et al. |
| 8,761,181 B1 * | 6/2014 | Gostev ............... H04L 1/1614 370/393 |
| 8,792,495 B1 | 7/2014 | Dixon et al. |

(Continued)

OTHER PUBLICATIONS

International search report for PCT application No. PCT/US2016/063275, dated Mar. 3, 2017 (3 pages).

(Continued)

*Primary Examiner* — Pao Sinkantarakorn
(74) *Attorney, Agent, or Firm* — Barnes & Thornburg LLP (57) ABSTRACT

Technologies for tracking out-of-order network packets include a target computing node coupled to a source computing node via a communication channel. The target computing node is configured to allocate a small window in memory in which to store a bit mask corresponding to a number of out-of-order network packets received from the source computing node via the communication channel. The target computing node is further configured to update the bit mask in the small window upon receiving an out-of-order network packet from the source computing node. The target computing node is additionally configured to allocate a large window in memory in response to a determination the size of the bit mask is larger than the size of the small window, store the bit mask in the large window, and store a pointer to the large window in the small window. Other embodiments are described and claimed.

21 Claims, 4 Drawing Sheets

(56) References Cited

U.S. PATENT DOCUMENTS

| | | | |
|---|---|---|---|
| 2004/0008711 A1* | 1/2004 | Lahti | H04L 47/34 370/428 |
| 2005/0025152 A1* | 2/2005 | Georgiou | H04L 47/10 370/394 |
| 2005/0180327 A1* | 8/2005 | Banerjee | H04L 47/10 370/236 |
| 2005/0286526 A1* | 12/2005 | Sood | H04L 47/10 370/394 |
| 2007/0208820 A1 | 9/2007 | Makhervaks et al. | |

OTHER PUBLICATIONS

Written opinion for PCT application No. PCT/US2016/063275, dated Mar. 3, 2017 (5 pages).

* cited by examiner

TECHNOLOGIES FOR TRACKING OUT-OF-ORDER NETWORK PACKETS

GOVERNMENT RIGHTS CLAUSE

This invention was made with Government support under contract number H98230-13-D-0124 awarded by the Department of Defense. The Government has certain rights in this invention.

BACKGROUND

Modern computing devices have become ubiquitous tools for personal, business, and social uses. As such, many modern computing devices are capable of connecting to various data networks, including the Internet and corporate intranets, to transmit and receive data communications over the various data networks at varying rates of speed. To facilitate communications between computing devices, the data networks typically include one or more computing nodes (e.g., network switches, network routers, servers, other compute and/or store computing devices, etc.) to route communications (i.e., network packets) from a source computing device to a destination computing device. Certain network infrastructures, such as data centers, may include tens of thousands or more of such computing nodes, making transmission and reception of the network packets in sequential order difficult at best.

As such, various out-of-order, end-to-end protocols have been implemented to manage transmitting and receiving the potentially thousands of network packets that may be in flight at any given time. For example, to handle such large out-of-order network traffic volume, microarchitecture technologies have been implemented to provide hardware level end-to-end retry protocols to leverage simply accepting the next packet in a sequence of network packets, regardless or the order in which they are received. In some cases, software has been utilized to apply reliability by resequencing headers of the network packets to restore sequential order without hardware checking; however, such software-based resequencing is not typically applicable to direct data placement operations or atomic operations. Similarly, transmission control protocol (TCP) supports selective reject capabilities; however, such use cases typically depend on reassembly of the received out-of-order network packets in host memory, which typically introduces overhead and latency.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
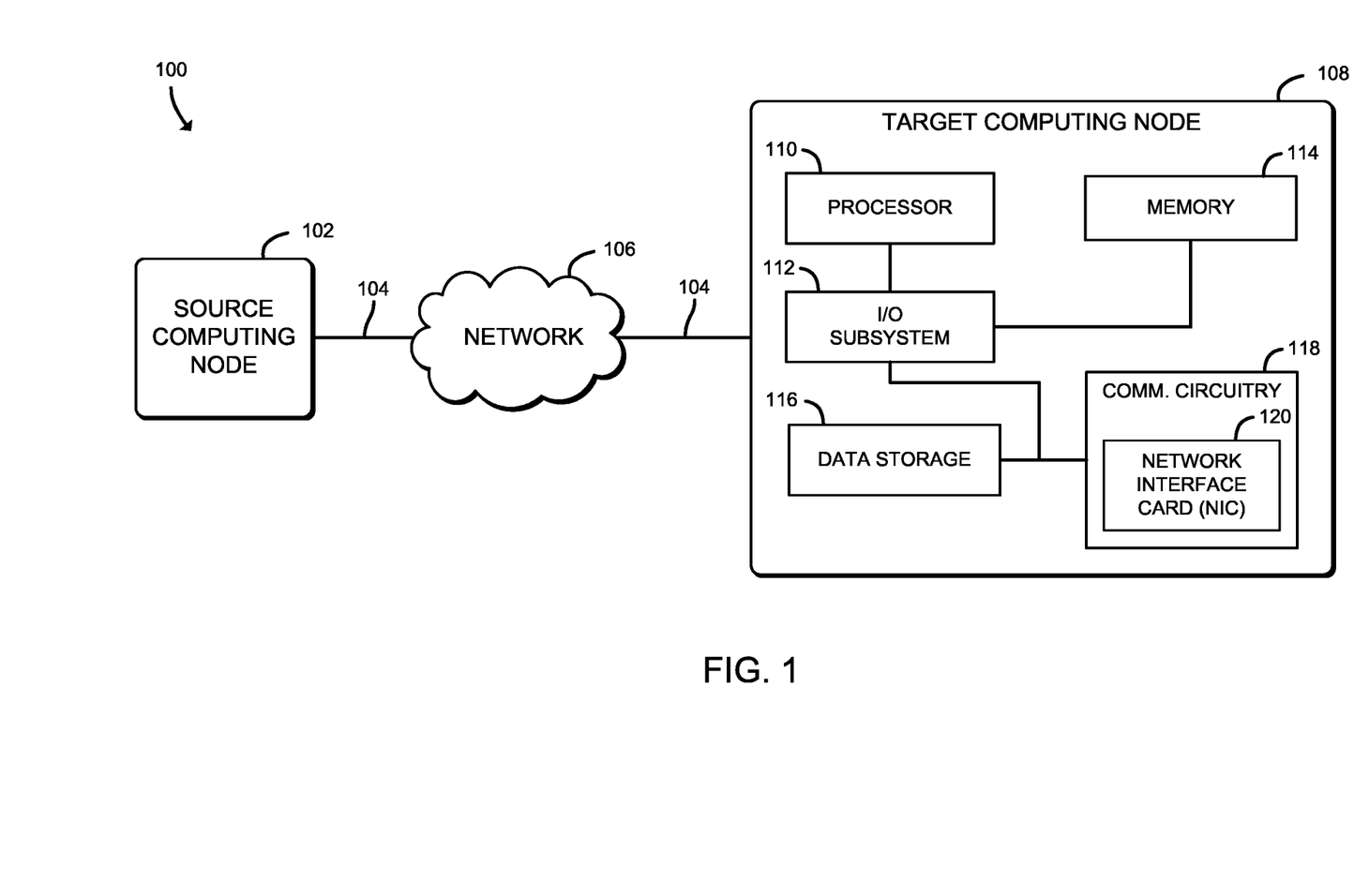
FIG. 1 is a simplified block diagram of at least one embodiment of a system for tracking out-of-order network packets that includes a source computing node and a target computing node communicatively coupled over a communication channel via a network.

Referring now to FIG. 1, in an illustrative embodiment, a system 100 for tracking out-of-order network packets (i.e., when delivery of network packets for a particular flow of network packets is different from the order in which the network packets were sent) includes a source computing node 102 communicatively coupled to a target computing node 108 over a communication channel 104 via a network 106. The source computing node 102 is configured to transmit information (e.g., a data object, an acknowledgment, etc.) to the target computing node 108 via one or more network packets generated by the source computing device 102.

In some embodiments, the network packet(s) include a header and some information, typically formatted as an inline message or appended payload. The header includes identifying information of the network packet, while the payload includes at least a portion of a data object (e.g., as a result of packetizing the data object). It should be appreciated that while the source computing device 102 may transmit each of the network packets in sequential order, one or more of the network packets may be received out-of-order. As such, the source computing device 102 is configured to assign a sequence number that is usable by the target computing node 108 to reconstruct the data object from the received out-of-order network packets. In other words, the target computing node 108 can reorder the network packets received out-of-order, based on the sequence numbers.

In use, the target computing node 108 tracks the sequence numbers of the out-of-order network packets it has received. To do so, the target computing node 108 tracks an expected packet sequence number (e.g., using the most recent contiguously received packet sequence number to determine the sequence number of the network packet expected to be received next) and a bit mask (i.e., data that is usable for bitwise operations in a bit field) representing the sequence numbers of the out-of-order network packets that have been received by the target computing node 108.

The target computing node 108 is configured to allocate a small amount of window state (i.e., a small window) in memory upon establishing the communication channel 104 in which the bit mask can be stored. In an illustrative example in which the target computing node 108 has received contiguous network packets with sequence numbers between 0 and 97, the expected packet sequence number would correspond to sequence number 98 (i.e., the network packet with the sequence number 98 assigned to it). In such an example, the bit mask in the small window tracks the out-of-order received network packets assigned sequence numbers 99 and beyond by the source computing device 102.

However, in some instances, the number of bits required to represent the received out-of-order network packets in the bit mask may be too large for the small window. In other words, the number of bits allocated for the small window may not be sufficient in size to handle the bit mask. In such instances, the target computing node 108 is configured to allocate an amount of window state (i.e., a window large enough to support the size of the bit mask), referred to herein as a large window, in which to store the bit mask. Accordingly, the target computing node 108 can then move the bit mask that was previously stored in the small window into the large window, updating as necessary to account for the received network packets. Additionally, the target computing node 108 is configured to store a pointer to the large window (i.e., a pointer to the memory address allocated to the large window in which the bitmask is stored) in the small window, such that the target computing node 108 is capable of using the pointer in the small window to retrieve/update the bit mask from the large window.

While only a single source computing node 102 and a single target computing node 108 is shown in the illustrative system 100, it should be appreciated that, in some alternative embodiments, the system 100 may include one or more source computing nodes 102 communicatively coupled with one or more target computing nodes 108. One such example alternative embodiment includes many (e.g., tens of thousands) source computing nodes 102 communicating with a few (e.g., tens or hundreds) target computing nodes 108, resulting in a large number of connections (i.e., communication channels 104) at each of the target computing nodes 108 communicating at a low packet rate. Another such example alternative embodiment includes a few (e.g., tens or hundreds) source computing nodes 102 communicating with many (e.g., tens of thousands) target computing nodes 108, resulting in a small number of connections (i.e., communication channels 104) at each of the target computing nodes 108 communicating at a high packet rate.

The target computing node 108 may be embodied as any type of computation or computing device capable of performing the functions described herein, including, without limitation, a server (e.g., stand-alone, rack-mounted, blade, etc.), a network appliance (e.g., physical or virtual), a switch, a router, a web appliance, a distributed computing system, a processor-based system, a multiprocessor system, and/or any other computing/communication device. The illustrative target computing node 108 includes a processor 110, an input/output (I/O) subsystem 112, a memory 114, a data storage device 116, and communication circuitry 118. Of course, the target computing node 108 may include other or additional components, such as those commonly found in a network computing device (e.g., various input/output devices), in other embodiments. Additionally, in some embodiments, one or more of the illustrative components may be incorporated in, or otherwise form a portion of, another component. For example, the memory 114, or portions thereof, may be incorporated in the processor 110 in some embodiments. Further, in some embodiments, one or more of the illustrative components may be omitted from the target computing node 108.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the target computing node 108, such as operating systems, applications, programs, libraries, and drivers.

The memory 114 is communicatively coupled to the processor 110 via the I/O subsystem 112, which may be embodied as circuitry and/or components to facilitate input/output operations with the processor 110, the memory 114, and other components of the target computing node 108. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the target computing node 108, on a single integrated circuit chip.

The data storage device 116 may be embodied as any type of device or devices configured for short-term or long-term storage of data such as, for example, memory devices and circuits, memory cards, hard disk drives, solid-state drives, or other data storage devices. The data storage device 116 and/or the memory 114 may store various data as described herein, including operating systems, applications, programs, libraries, drivers, instructions, etc., capable of being executed by a processor (e.g., the processor 110) of the target computing node 108.

The communication circuitry 118 may be embodied as any communication circuit, device, or collection thereof, capable of establishing a communication channel (e.g., the communication channel 104) and enabling communications between the target computing node 108 and other remote devices (e.g., the source computing node 102) over a network (e.g., the network 106). The communication circuitry 118 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication. In some embodiments, the communication circuitry 118 is further configured to perform high-speed communication (e.g., in a high performance compute (HPC) environment) with other like computing devices.

The illustrative communication circuitry 118 includes a network interface controller (NIC) 120, also commonly referred to as a host fabric interface (HFI) in fabric interconnects. The NIC 120 may be embodied as one or more add-in-boards, daughtercards, network interface cards, controller chips, chipsets, or other devices that may be used by the target computing node 108. For example, in some embodiments, the NIC 120 may be integrated with the processor 110, embodied as an expansion card coupled to the I/O subsystem 112 over an expansion bus (e.g., PCI Express), part of an SoC that includes one or more processors, or included on a multichip package that also contains one or more processors. It should be appreciated that, in some embodiments, the NIC 212 may be capable of performing the offloaded functions as described herein. Additionally or alternatively, in such embodiments, the NIC 212 may include a local processor (not shown) and/or local memory (not shown) capable of processing and storing data locally, respectively, such that a state of the target computing node 108 is not affected (i.e., no software latency introduced).

The source computing node 102 may be embodied as any type of computation or computing device capable of performing the functions described herein, including, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a personal computer, a server (e.g., stand-alone, rack-mounted, blade, etc.), a network appliance (e.g., physical or virtual), a web appliance, a distributed computing system, a processor-based system, a multiprocessor system, and/or any other computing/communication device. As such, the source computing node 102 may contain like and/or similar components to that of the illustrative target computing node 108 described previously. Accordingly, it should be appreciated that the source computing node 102 may include similar components to the illustrative target computing node 108, which are not described herein for clarity of the description.

The network 106 may be embodied as any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. Additionally, the network 106 may include any number of may include additional computing devices (i.e., networking devices) (not shown), physical and/or virtual, that may be commonly found in networks, such as servers, switches, routers, access points, network controllers, etc. It should be appreciated that, in some embodiments, the network 106 may be embodied as any type of parallel and/or distributed computing architecture (e.g., a high performance computing (HPC) network architecture) that is capable of high-speed, low-latency interconnectivity, such as a cluster computing network architecture and/or a grid computing network architecture (e.g., a fabric computing network architecture).

Figure 2:
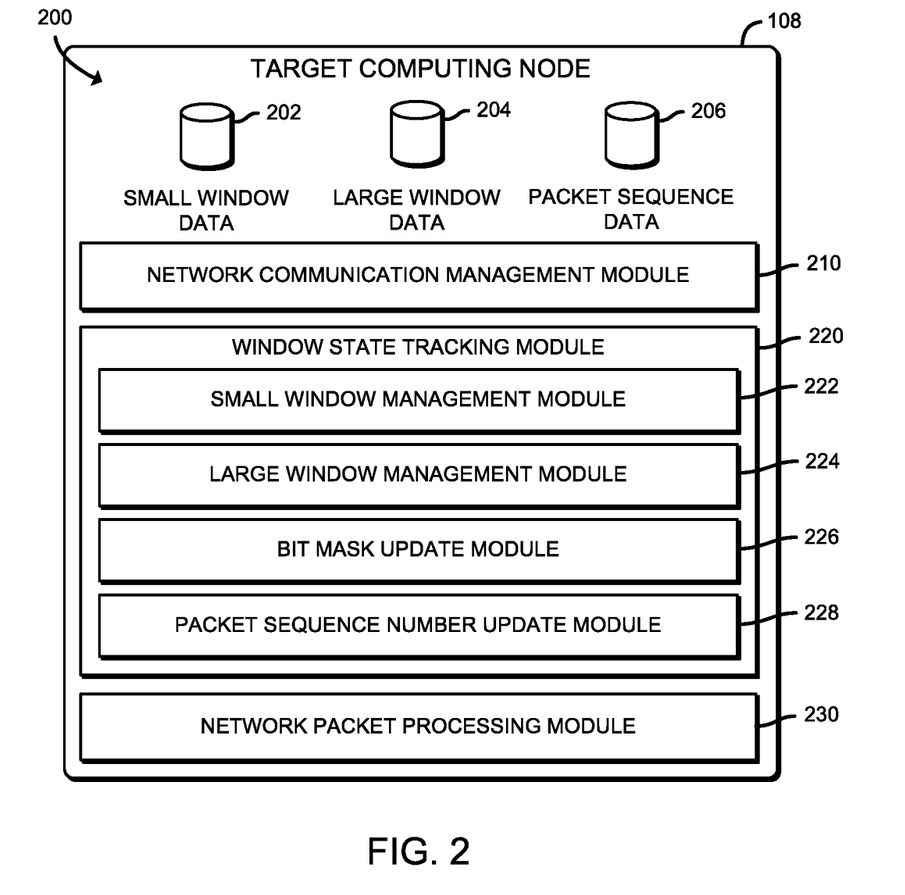
FIG. 2 is a simplified block diagram of at least one embodiment of an environment that may be established by the target computing node of the system of FIG. 1.

Referring now to FIG. 2, in an illustrative embodiment, the target computing node 108 establishes an environment 200 during operation. The illustrative environment 200 includes a network communication management module 210, a window state tracking module 220, and a network packet processing module 230. Each of the modules, logic, and other components of the environment 200 may be embodied as hardware, software, firmware, or a combination thereof. For example, each of the modules, logic, and other components of the environment 200 may form a portion of, or otherwise be established by, the processor 110 or other hardware components of the target computing node 108. As such, in some embodiments, one or more of the modules of the environment 200 may be embodied as circuitry or a collection of electrical devices (e.g., network communication management circuitry 210, a window state tracking circuitry 220, and a network packet processing circuitry 230, etc.).

In the illustrative environment 200, the target computing node 108 additionally includes small window data 202, large window data 204, and packet sequence data 206, each of which may be stored in the memory 114 and/or the data storage 116 of the target computing node 108, and may be accessed by the various modules and/or sub-modules of the target computing node 108. Each of the small window data 202, the large window data 204, and the packet sequence data 206 may be stored in the memory 114 and/or the data storage 116. It should be appreciated that the target computing node 108 may include other components, sub-components, modules, sub-modules, circuitry, and/or devices commonly found in a computing node of a network, which are not illustrated in FIG. 2 for clarity of the description.

The network communication management module 210 is configured to manage inbound and outbound network communications (e.g., network traffic, network packets, network flows, etc.) to and from the target computing node 108. To do so, the network communication management module 210 is configured to receive and process network packets from other computing devices (e.g., the source computing node 102 and/or other computing nodes communicatively coupled to the target computing node). Additionally, the network communication management module 210 is configured to prepare and transmit network packets to another computing device (e.g., the source computing node 102 and/or other computing nodes communicatively coupled to the target computing node). Accordingly, in some embodiments, at least a portion of the functionality of the network communication management module 210 may be performed by the communication circuitry 118, and more specifically by the NIC 120.

The window state tracking module 220 is configured to track the received out-of-order (i.e., out of sequence) network packets for each of the communication channels of the target computing node 108. To do so, the window state tracking module 220 is configured to track the received out-of-order network packets for each of the communicatively coupled source computing nodes 102 via a packet sequence number table, which may be stored in the packet sequence data 206. As such, each entry of the packet sequence number table (see, e.g., the packet sequence number table entry 300 of FIG. 3) corresponds to one of the source computing nodes 102. As described previously, the target computing node 108 is configured to track the received out-of-order network packets using small and large windows, depending on the size of the small window and the bit mask to be stored therein. To distinguish which entry of the packet sequence number table corresponds to a small or large window, a Boolean bit (see, e.g., the window use indicator 304 of FIG. 3) of the packet sequence number table entry may be used. In such an embodiment, a value of "0" may indicate that a small window is presently being used to track the received out-of-order network packets; whereas a value of "1" may be used to indicate that a large window is presently being used to track the received out-of-order network packets.

To track the received out-of-order network packets for each of the communication channels of the target computing node 108, the illustrative window state tracking module 220 includes a small window management module 222, a large window management module 224, a bit mask update module 226, and a packet sequence number update module 228. As described previously, a small window state is tracked on a per-peer (e.g., a per source computing node 102 or a per communication channel 104) basis for network packets that have been received out-of-order. Accordingly, the small window management module 222 is configured to manage the small windows for tracking the out-of-order network packets received from each of the source computing nodes 102 communicatively coupled to the target computing node 108.

To do so, the small window management module 222 is configured to allocate a portion of memory having a size large enough to store the bit mask or a pointer to a large window allocated to store the bit mask, as described in further detail below, depending on the size of the bit mask relative to the network packets that have been received out-of-order. Accordingly, it should be appreciated that the size of the small window is at least as large as the pointer it may be directed to store. The small window management module 222 is further configured to update the indicator (e.g., the window use indicator 304 of FIG. 3) of the corresponding packet sequence number table entry to indicate whether the small window or large window is in use.

Figure 3:
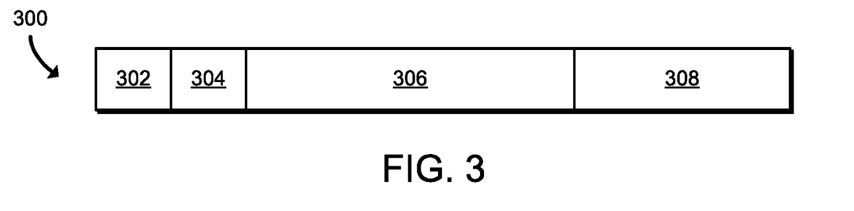
FIG. 3 is an illustration of a packet sequence number table entry that may be generated by the target computing node of FIGS. 1 and 2.

As also described previously, a large window may be allocated for the source computing node 102, such as when the target computing node 108 determines the bit mask for tracking the received out-of-order network packets is too large to be stored in the small window. It should be appreciated that, in some embodiments, the large window may be allocated at the time at which the initial connection with the source computing node 102 is established. Accordingly, the large window management module 224 is configured to manage the large windows for tracking the out-of-order network packets received from each of the source computing nodes 102 communicatively coupled to the target computing node 108 for which the bit mask is too large to be stored in the small window. To do so, the large window management module 224 is configured to allocate a portion of memory having a size large enough to store the bit mask. The large window management module 224 is further configured to provide (e.g., to the small window management module 222) a pointer providing a reference to the large window (e.g., an address in memory in which the large window resides) usable to be stored in the small window portion of the corresponding entry of the packet sequence number table (see, e.g., the small window 306).

The bit mask update module 226 is configured to update the bit mask used by the target computing node 108 to track the received out-of-order network packets. Accordingly, the bit mask update module 226 is configured to update the bit mask in either the small window or the large window. To do so, the bit mask update module 226 is configured to read the window use indicator 304 and update the bit mask in the appropriate location (i.e., the small window or the large window).

The packet sequence number update module 228 is configured to update the expected packet sequence number used by the target computing node 108 to track the received out-of-order network packets. Accordingly, the packet sequence number update module 228 is configured to update the expected packet sequence number (see, e.g., the unordered packet sequence number indicator 308 of FIG. 3) corresponding to the source computing device 102 from which the network packets have been received. To do so, the packet sequence number update module 228 is configured to determine whether a packet sequence number of the received out-of-order network packet corresponds to the expected packet sequence number at the time in which a network packet is received at the target computing node 108, and update the expected packet sequence number if necessary.

The network packet processing module 230 is configured to process the received network packet. For example, in some embodiments, the network packet processing module 230 may be configured to perform a routing/forwarding lookup to determine a destination computing node, perform one or more service functions on the network packet (e.g., firewall, network address translation (NAT), load-balancing, deep packet inspection (DPI), transmission control protocol (TCP) optimization services, etc.), update a header of the network packet, etc.

Referring now to FIG. 3, an illustrative packet sequence number table entry 300, such as may be stored in a packet sequence number table, is generated by the target computing node 108 to track received packets at the target computing node 108. The illustrative packet sequence number table entry 300 includes a connection state indicator 302, a window use indicator 304, a small window 306, and an unordered packet sequence number indicator 308. The connection state indicator is usable to store a Boolean bit indicative of whether the corresponding connection (i.e., the communication channel 104) between the source computing node 102 and the target computing node 108 is active or not.

The window use indicator 304 is usable to store a Boolean bit indicative of whether the small window 306 is representative of a small window (i.e., is storing the bitmask) or not (i.e., is storing a pointer to a large window). The small window 306, as described previously, is usable to store a bit mask corresponding to the received out-of-order network packets or a pointer to a large window at which the bit mask has been stored. The unordered packet sequence number indicator 308 is usable to store the expected packet sequence number corresponding to a packet sequence number corresponding to the network packet that is expected to be received next (i.e., based on contiguous sequential ordering of the packet sequence numbers to be received). As described previously, each network packet is assigned a packet sequence number by the source computing node 102 prior to transmission of the network packet to the target computing node 108. As such, the unordered packet sequence number indicator 308 is usable by the target computing node 108 to determine which out-of-order network packet is the next out-of-order network packet to be received by the target computing node 108 from the source computing node 102. In some embodiments, the packet sequence number may be stored in a header of the network packet.

Figure 4:
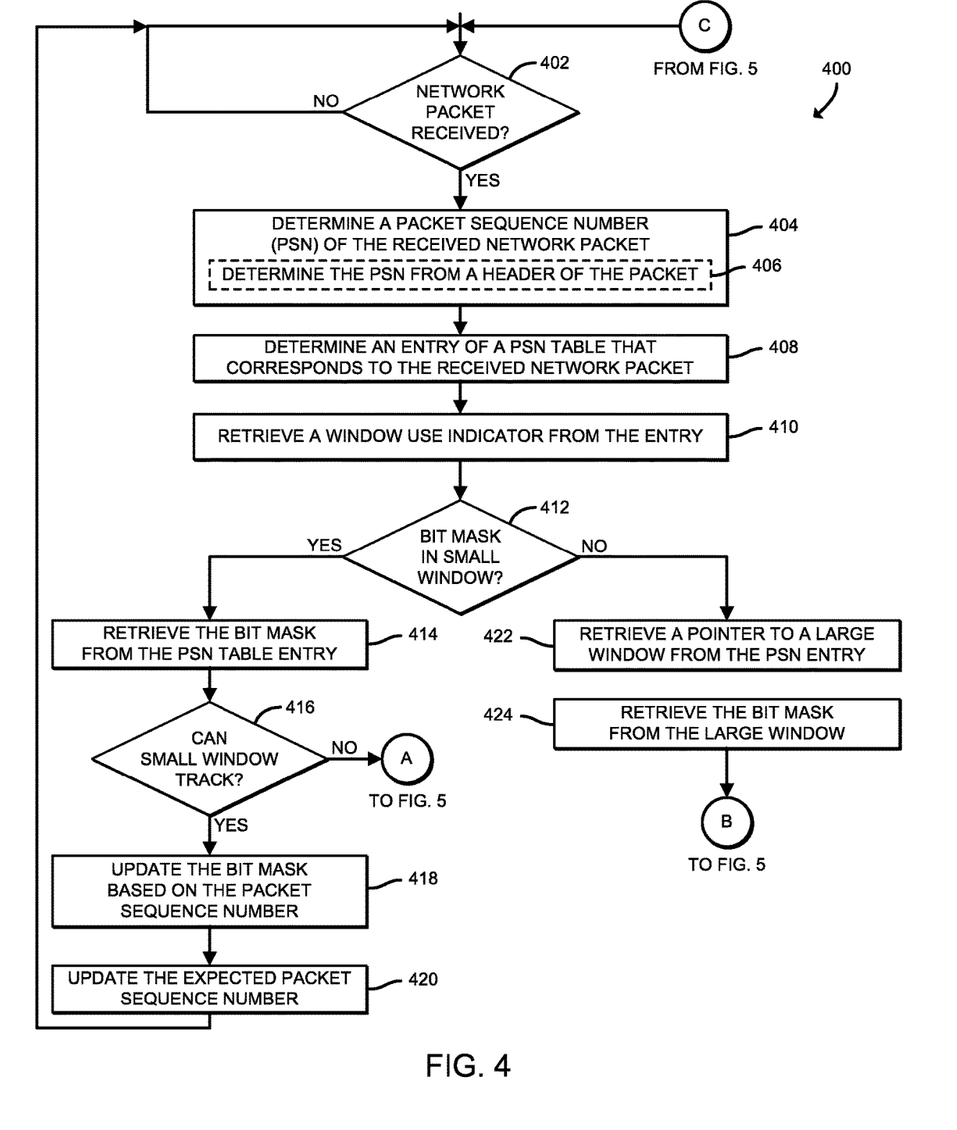
FIGS. 4 and 5 is a simplified flow diagram of at least one embodiment of a method for tracking out-of-order network packets that may be executed by the target computing node of FIGS. 1 and 2.
Figure 5:
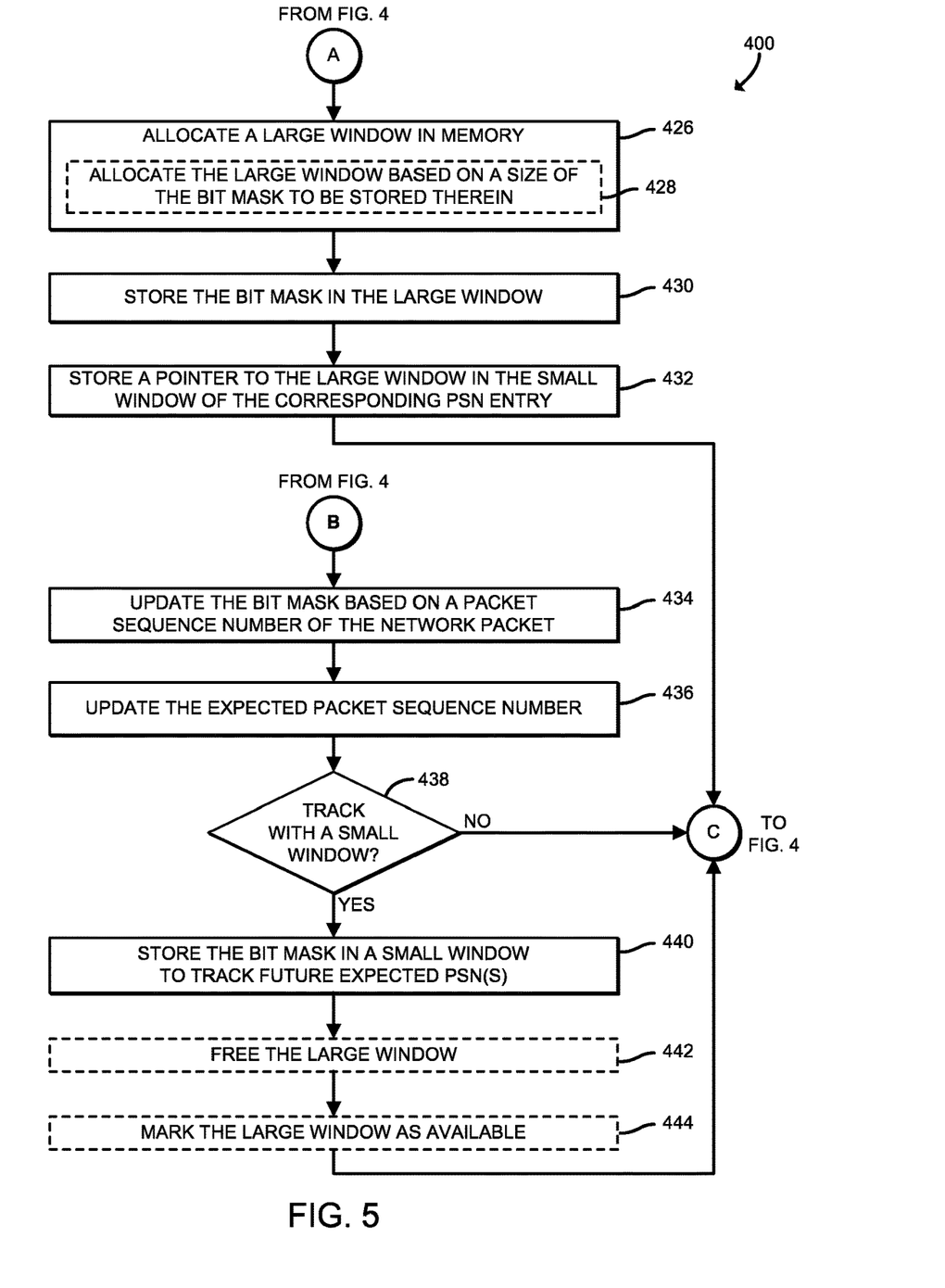

Referring now to FIGS. 4 and 5, in use, the target computing node 108 may execute a method 400 for tracking out-of-order network packets. It should be appreciated that, in some embodiments, the method 400 may be embodied as various instructions stored on a computer-readable media, which may be executed by the processor 110, the NIC 120, and/or other components of the target computing node 108 to cause the target computing node 108 to perform the method 400. The computer-readable media may be embodied as any type of media capable of being read by the target computing node 108 including, but not limited to, the memory 114, the data storage device 116, a local memory of the network interface controller 120, other memory or data storage devices of the target computing node 108, portable media readable by a peripheral device of the target computing node 108, and/or other media.

The method 400 begins with block 402, in which the target computing node 108 determines whether an out-of-order network packet has been received. If so, the method 400 advances to block 404, in which the target computing node 108 determines a packet sequence number of the received out-of-order network packet. In some embodiments, in block 406, the target computing node 108 determines the packet sequence from a header of the received out-of-order network packet. In block 408, the target computing node 108 determines which entry of a packet sequence number table corresponds to the communication channel through which the network packet was received. It should be appreciated that a corresponding entry may not exist in the packet sequence number table, such as when a previous communication channel has not been established with the source computing node 102. Accordingly, the target computing node 108 may generate the corresponding entry. In block 410, the target computing node 108 retrieves a window use indicator (e.g., the window use indicator 304 of the packet sequence number table entry 300 of FIG. 3) from the corresponding packet sequence number table entry (e.g., the packet sequence number table entry 300 of FIG. 3).

In block 412, the target computing node 108 determines whether a bit mask used to track previously received out-of-order network packets is in a small window (e.g., the small window 306) of the corresponding packet sequence number table entry. If so, the method 400 branches to block 414, in which the target computing node 108 retrieves the bit mask from the small window of the corresponding packet sequence number table entry. In block 416, the target computing node 108 determines whether the small window can track the packet sequence number in the bit mask. In other words, the target computing node 108 determines whether the updated bit mask would fit (i.e., not be too large to store) in the small window.

If so, the method 400 branches to block 418, in which the target computing node 108 updates the bit mask of the small window based on the packet sequence number. In block 420, the target computing node 108 updates the expected packet sequence number (i.e., the unordered packet sequence number indicator 308 of the packet sequence number table entry 300 of FIG. 3) of the corresponding entry. For example, in an embodiment in which the expected packet sequence number corresponds to packet sequence number 17 and the bit mask indicates network packets with sequence numbers between 19 and 1039 have been received, if the packet sequence number of the received network packet has been assigned packet sequence number 17, the target computing node 108 would update the expected packet sequence number (i.e., increments the expected packet sequence number) to reflect the next expected packet sequence number is packet sequence number 18. Additionally, the target computing node 108 would update the bit mask (i.e., shift the vector represented in the bit mask by one bit) to reflect the packet sequence number of the received network packet.

If the target computing node 108 determines the small window cannot track the packet sequence number in the bit mask (i.e., the small window is not large enough) in block 416, the method branches to block 426 of FIG. 5. In block 426 (i.e., reached from block 416), the target computing node 108 allocates a large window. To do so, in some embodiments, in block 428, the target computing node 108 allocates a size of the large window based on a size of the bit mask to be stored in the large window. In block 430, the target computing node 108 stores the bit mask in the large window. In block 432, the target computing node 108 stores a pointer to the large window in the small window of the corresponding packet sequence number table entry before the method 400 returns to block 402 to determine whether another out-of-order network packet has been received.

Referring again to block 412 of FIG. 4, if the target computing node 108 determines the bit mask is not in the small window (i.e., the small window contains a pointer to a large window allocated to store the bit mask), the method 400 branches to block 422. In block 422, the target computing node 108 retrieves the pointer to the large window from the small window of the corresponding packet sequence number table entry. In block 424, the target computing node 108 retrieves the bit mask from the large window using the pointer retrieved in block 422, before the method 400 advances to block 434 of FIG. 5, which is described below.

In block 434, the target computing node 108 updates the bit mask of the large window based on a packet sequence number of the network packet. In block 436, the target computing node 108 updates the expected packet sequence number (i.e., the unordered packet sequence number indicator 308 of FIG. 3) of the corresponding entry. In block 438, the target computing node 108 determines whether to track the out-of-order network packets with a small window. In other words, the target computing node 108 determines whether the bit mask can now fit in the small window after the update or whether all of the expected network packet(s) have been received, thereby indicating no further tracking is necessary. If not, the method 400 returns to block 402 to determine whether another out-of-order network packet was received; otherwise, the method 400 advances to block 440.

In block 440, the target computing node 108 stores the bit mask in the small window to track future expected out-of-order packet sequence numbers. In some embodiments, in block 442, the target computing node 108 frees the large window (i.e., the memory allocated to store the large window is freed). Alternatively, in some embodiments, in block 444, the target computing node 108 marks the large window as available. It should be appreciated that, in some embodiments, the large window marked as available may remain allocated to the original source computing node 102 for which the large window was originally allocated. From block 444, the method 400 returns to block 402 to determine whether another out-of-order network packet has been received.

EXAMPLES

Illustrative examples of the technologies disclosed herein are provided below. An embodiment of the technologies may include any one or more, and any combination of, the examples described below.

Example 1 includes a target computing node for tracking out-of-order network packets, the target computing node comprising one or more processors; and one or more memory devices having stored therein a plurality of instructions that, when executed by the one or more processors, cause the target computing node to establish a communication channel with a source computing node via a network; generate an entry of a packet sequence number table corresponding to the communication channel, wherein the entry includes a small window that defines a portion of memory of the target computing node allocated to store a bit mask corresponding to a number of out-of-order network packets received by the target computing node through the communication channel; receive a plurality of out-of-order network packets from the source computing node via the communication channel; and update the bit mask in the small window of the packet sequence number table corresponding to the communication channel as a function of a packet sequence number of each of the plurality of out-of-order network packets received from the source computing node.

Example 2 includes the subject matter of Example 1, and wherein to update the bit mask in the packet sequence number table comprises to (i) determine whether a size of the bit mask is larger than a size of the small window, (ii) allocate, in response to a determination the size of the bit mask is larger than the size of the small window, a large window that defines another portion of memory of the target computing node allocated to store the bit mask corresponding to a number of out-of-order network packets received by the target computing node through the communication channel, wherein a size of the large window exceeds the size of the bit mask, (iii) store the bit mask in the large window, and (iv) store a pointer to the large window in the small window.

Example 3 includes the subject matter of any of Examples 1 and 2, and wherein the plurality of instructions further cause the target computing node to receive an additional out-of-order network packet; update the bit mask in the large window as a function of the received additional out-of-order network packet; determine whether a size of the updated bit mask is larger than the size of the small window; and replace, in response to a determination the size of the updated bit mask is not larger than the size of the small window, the pointer to the large window with the updated bit mask.

Example 4 includes the subject matter of any of Examples 1-3, and wherein the plurality of instructions further cause the target computing node to free, subsequent to the determination that no additional network packets are being tracked, the memory allocated to the large window.

Example 5 includes the subject matter of any of Examples 1-4, and wherein the plurality of instructions further cause the target computing node to mark, subsequent to the determination that no additional network packets are being tracked, the large window as available and allocated to the source computing node.

Example 6 includes the subject matter of any of Examples 1-5, and wherein the entry additionally includes a connection state indicator to indicate whether the communication channel is active.

Example 7 includes the subject matter of any of Examples 1-6, and wherein the entry additionally includes an unordered packet sequence number indicator corresponding to a packet sequence number of the next expected network packet.

Example 8 includes the subject matter of any of Examples 1-7, and wherein the entry additionally includes a window use indicator to indicate whether the small window corresponds to one of the bit mask or a pointer to a large window in which the bit mask is stored.

Example 9 includes a method for tracking out-of-order network packets, the method comprising establishing, by a target computing node, a communication channel with a source computing node via a network; generating, by the target computing node, an entry of a packet sequence number table corresponding to the communication channel, wherein the entry includes a small window defining a portion of memory of the target computing node allocated to store a bit mask corresponding to a number of out-of-order network packets received by the target computing node through the communication channel; receiving, by the target computing node, a plurality of out-of-order network packets from the source computing node via the communication channel; and updating, by the target computing node, the bit mask in the small window of the packet sequence number table corresponding to the communication channel as a function of a packet sequence number of each of the plurality of out-of-order network packets received from the source computing node.

Example 10 includes the subject matter of Example 9, and wherein updating the bit mask in the packet sequence number table comprises determining, by the target computing node, whether a size of the bit mask is larger than a size of the small window; allocating, by the target computing node and in response to a determination the size of the bit mask is larger than the size of the small window, a large window defining another portion of memory of the target computing node allocated to store the bit mask corresponding to a number of out-of-order network packets received by the target computing node through the communication channel, and wherein a size of the large window exceeds the size of the bit mask; storing, by the target computing node, the bit mask in the large window; and storing, by the target computing node, a pointer to the large window in the small window.

Example 11 includes the subject matter of any of Examples 9 and 10, and further including receiving, by the target computing node, an additional out-of-order network packet; updating, by the target computing node, the bit mask in the large window as a function of the received additional out-of-order network packet; determining, by the target computing node, whether a size of the updated bit mask is larger than the size of the small window; and replacing, by the target computing node and in response to a determination the size of the updated bit mask is not larger than the size of the small window, the pointer to the large window with the updated bit mask.

Example 12 includes the subject matter of any of Examples 9-11, and further including freeing, by the target computing node and subsequent to the determination that no additional network packets are being tracked, the memory allocated to the large window.

Example 13 includes the subject matter of any of Examples 9-12, and further including marking, by the target computing node and subsequent to the determination that no additional network packets are being tracked, the large window as available and allocated to the source computing node.

Example 14 includes the subject matter of any of Examples 9-13, and wherein generating the entry comprises generating a connection state indicator to indicate whether the communication channel is active.

Example 15 includes the subject matter of any of Examples 9-14, and wherein generating the entry comprises generating an unordered packet sequence number indicator corresponding to a packet sequence number of the next expected network packet.

Example 16 includes the subject matter of any of Examples 9-15, and wherein generating the entry comprises generating a window use indicator to indicate whether the small window corresponds to one of the bit mask or a pointer to a large window in which the bit mask is stored.

Example 17 includes a target computing node comprising a processor; and a memory having stored therein a plurality of instructions that when executed by the processor cause the target computing node to perform the method of any of Examples 9-16.

Example 18 includes one or more machine readable storage media comprising a plurality of instructions stored thereon that in response to being executed result in a target computing node performing the method of any of Examples 9-16.

Example 19 includes a target computing node for tracking out-of-order network packets, the target computing node comprising network communication management circuitry to establish a communication channel with a source computing node via a network; and window state tracking circuitry to generate an entry of a packet sequence number table corresponding to the communication channel, wherein the entry includes a small window that defines a portion of memory of the target computing node allocated to store a bit mask corresponding to a number of out-of-order network packets received by the target computing node through the communication channel; wherein the network communication management circuitry is further to receive a plurality of out-of-order network packets from the source computing node via the communication channel, and wherein the window state tracking circuitry is further to update the bit mask in the small window of the packet sequence number table corresponding to the communication channel as a function of a packet sequence number of each of the plurality of out-of-order network packets received from the source computing node.

Example 20 includes the subject matter of Example 19, and wherein to update the bit mask in the packet sequence number table comprises to (i) determine whether a size of the bit mask is larger than a size of the small window, (ii) allocate, in response to a determination the size of the bit mask is larger than the size of the small window, a large window that defines another portion of memory of the target computing node allocated to store the bit mask corresponding to a number of out-of-order network packets received by the target computing node through the communication channel, wherein a size of the large window exceeds the size of the bit mask, (iii) store the bit mask in the large window, and (iv) store a pointer to the large window in the small window.

Example 21 includes the subject matter of any of Examples 19 and 20, and wherein the network communication management circuitry is further to receive an additional out-of-order network packet, wherein the window state tracking circuitry is further to (i) update the bit mask in the large window as a function of the received additional out-of-order network packet, (ii) determine whether a size of the updated bit mask is larger than the size of the small window; and (iii) replace, in response to a determination the size of the updated bit mask is not larger than the size of the small window, the pointer to the large window with the updated bit mask.

Example 22 includes the subject matter of any of Examples 19-21, and wherein the window state tracking circuitry is further to free, subsequent to the determination that no additional network packets are being tracked, the memory allocated to the large window.

Example 23 includes the subject matter of any of Examples 19-22, and wherein the window state tracking circuitry is further to mark, subsequent to the determination that no additional network packets are being tracked, the large window as available and allocated to the source computing node.

Example 24 includes the subject matter of any of Examples 19-23, and wherein the entry additionally includes a connection state indicator to indicate whether the communication channel is active.

Example 25 includes the subject matter of any of Examples 19-24, and wherein the entry additionally includes an unordered packet sequence number indicator corresponding to a packet sequence number of the next expected network packet.

Example 26 includes the subject matter of any of Examples 19-25, and wherein the entry additionally includes a window use indicator to indicate whether the small window corresponds to one of the bit mask or a pointer to a large window in which the bit mask is stored.

Example 27 includes a target computing node for tracking out-of-order network packets, the target computing node comprising network communication management circuitry to establish a communication channel with a source computing node via a network; and means for generating an entry of a packet sequence number table corresponding to the communication channel, wherein the entry includes a small window that defines a portion of memory of the target computing node allocated to store a bit mask corresponding to a number of out-of-order network packets received by the target computing node through the communication channel; wherein the network communication management circuitry is further to receive a plurality of out-of-order network packets from the source computing node via the communication channel, and further comprising means for updating the bit mask in the small window of the packet sequence number table corresponding to the communication channel as a function of a packet sequence number of each of the plurality of out-of-order network packets received from the source computing node.

Example 28 includes the subject matter of Example 27, and wherein the means for updating the bit mask in the packet sequence number table comprises means for (i) determining whether a size of the bit mask is larger than a size of the small window, (ii) allocating, in response to a determination the size of the bit mask is larger than the size of the small window, a large window that defines another portion of memory of the target computing node allocated to store the bit mask corresponding to a number of out-of-order network packets received by the target computing node through the communication channel, wherein a size of the large window exceeds the size of the bit mask, (iii) storing the bit mask in the large window, and (iv) storing a pointer to the large window in the small window.

Example 29 includes the subject matter of any of Examples 27 and 28, and wherein the network communication management circuitry is further to receive an additional out-of-order network packet, and further comprising means for (i) updating the bit mask in the large window as a function of the received additional out-of-order network packet, (ii) determining whether a size of the updated bit mask is larger than the size of the small window; and (iii) replacing, in response to a determination the size of the updated bit mask is not larger than the size of the small window, the pointer to the large window with the updated bit mask.

Example 30 includes the subject matter of any of Examples 27-29, and further including means for freeing, subsequent to the determination that no additional network packets are being tracked, the memory allocated to the large window.

Example 31 includes the subject matter of any of Examples 27-30, and further including means for marking, subsequent to the determination that no additional network packets are being tracked, the large window as available and allocated to the source computing node.

Example 32 includes the subject matter of any of Examples 27-31, and wherein the entry additionally includes a connection state indicator to indicate whether the communication channel is active.

Example 33 includes the subject matter of any of Examples 27-32 and wherein the entry additionally includes an unordered packet sequence number indicator corresponding to a packet sequence number of the next expected network packet.

Example 34 includes the subject matter of any of Examples 27-33, and wherein the entry additionally includes a window use indicator to indicate whether the small window corresponds to one of the bit mask or a pointer to a large window in which the bit mask is stored.

The invention claimed is:

1. A target computing node for tracking out-of-order network packets, the target computing node comprising:
   one or more processors; and
   one or more memory devices having stored therein a plurality of instructions that, when executed by the one or more processors, cause the target computing node to:
      establish a communication channel with a source computing node via a network;
      generate an entry of a packet sequence number table corresponding to the communication channel, wherein the entry includes a small window that defines a portion of memory of the target computing node allocated to store a bit mask corresponding to a number of out-of-order network packets received by the target computing node through the communication channel, wherein the number of out-of-order network packets represented by the bit mask corresponds to one or more out-of-order network packets whose corresponding sequence number exceeds an expected packet sequence number of a next in-order network packet expected to be received by the target computing node;
      receive a plurality of out-of-order network packets from the source computing node via the communication channel; and
      update the bit mask in the small window of the packet sequence number table corresponding to the communication channel as a function of a packet sequence number of each of the plurality of out-of-order network packets received from the source computing node, wherein to update the bit mask in the packet sequence number table comprises to (i) determine whether a size of the bit mask is larger than a size of the small window, (ii) allocate, in response to a determination the size of the bit mask is larger than the size of the small window, a large window that defines another portion of memory of the target computing node allocated to store the bit mask corresponding to a number of out-of-order network packets received by the target computing node through the communication channel, wherein a size of the large window exceeds the size of the bit mask, (iii) store the bit mask in the large window, and (iv) store a pointer to the large window in the small window.

2. The target computing node of claim 1, wherein the plurality of instructions further cause the target computing node to:
   receive an additional out-of-order network packet;
   update the bit mask in the large window as a function of the received additional out-of-order network packet;
   determine whether a size of the updated bit mask is larger than the size of the small window; and
   replace, in response to a determination the size of the updated bit mask is not larger than the size of the small window, the pointer to the large window with the updated bit mask.

3. The target computing node of claim 2, wherein the plurality of instructions further cause the target computing node to free, subsequent to the determination that no additional network packets are being tracked, the memory allocated to the large window.

4. The target computing node of claim 2, wherein the plurality of instructions further cause the target computing node to mark, subsequent to the determination that no additional network packets are being tracked, the large window as available and allocated to the source computing node.

5. The target computing node of claim 1, wherein the entry additionally includes a connection state indicator to indicate whether the communication channel is active.

6. The target computing node of claim 1, wherein the entry additionally includes an unordered packet sequence number indicator corresponding to a packet sequence number of the next expected network packet.

7. The target computing node of claim 1, wherein the entry additionally includes a window use indicator to indicate whether the small window corresponds to one of the bit mask or the pointer to the large window in which the bit mask is stored.

8. One or more non-transitory, computer-readable storage media comprising a plurality of instructions stored thereon that in response to being executed cause a target computing node to:
   establish a communication channel with a source computing node via a network;
   generate an entry of a packet sequence number table corresponding to the communication channel, wherein the entry includes a small window that defines a portion of memory of the target computing node allocated to store a bit mask corresponding to a number of out-of-order network packets received by the target computing node through the communication channel, wherein the number of out-of-order network packets represented by the bit mask corresponds to one or more out-of-order network packets whose corresponding sequence number exceeds an expected packet sequence number of a next in-order network packet expected to be received by the target computing node;

receive a plurality of out-of-order network packets from the source computing node via the communication channel; and update the bit mask in the small window of the packet sequence number table corresponding to the communication channel as a function of a packet sequence number of each of the plurality of out-of-order network packets received from the source computing node, wherein to update the bit mask in the packet sequence number table comprises to (i) determine whether a size of the bit mask is larger than a size of the small window, (ii) allocate, in response to a determination the size of the bit mask is larger than the size of the small window, a large window that defines another portion of memory of the target computing node allocated to store the bit mask corresponding to a number of out-of-order network packets received by the target computing node through the communication channel, wherein a size of the large window exceeds the size of the bit mask, (iii) store the bit mask in the large window, and (iv) store a pointer to the large window in the small window.

9. The one or more non-transitory, computer-readable storage media of claim 8, wherein the plurality of instructions further cause the target computing node to:

receive an additional out-of-order network packet;
update the bit mask in the large window as a function of the received additional out-of-order network packet;
determine whether a size of the updated bit mask is larger than the size of the small window; and
replace, in response to a determination the size of the updated bit mask is not larger than the size of the small window, the pointer to the large window with the updated bit mask.

10. The one or more non-transitory, computer-readable storage media of claim 9, wherein the plurality of instructions further cause the target computing node to free, subsequent to the determination that no additional network packets are being tracked, the memory allocated to the large window.

11. The one or more non-transitory, computer-readable storage media of claim 9, wherein the plurality of instructions further cause the target computing node to mark, subsequent to the determination that no additional network packets are being tracked, the large window as available and allocated to the source computing node.

12. The one or more non-transitory, computer-readable storage media of claim 8, wherein the entry additionally includes a connection state indicator to indicate whether the communication channel is active.

13. The one or more non-transitory, computer-readable storage media of claim 8, wherein the entry additionally includes an unordered packet sequence number indicator corresponding to a packet sequence number of the next expected network packet.

14. The one or more non-transitory, computer-readable storage media of claim 8, wherein the entry additionally includes a window use indicator to indicate whether the small window corresponds to one of the bit mask or the pointer to the large window in which the bit mask is stored.

15. A method for tracking out-of-order network packets, the method comprising:

establishing, by a target computing node, a communication channel with a source computing node via a network;

generating, by the target computing node, an entry of a packet sequence number table corresponding to the communication channel, wherein the entry includes a small window defining a portion of memory of the target computing node allocated to store a bit mask corresponding to a number of out-of-order network packets received by the target computing node through the communication channel, wherein the number of out-of-order network packets represented by the bit mask corresponds to one or more out-of-order network packets whose corresponding sequence number exceeds an expected packet sequence number of a next in-order network packet expected to be received by the target computing node;

receiving, by the target computing node, a plurality of out-of-order network packets from the source computing node via the communication channel; and updating, by the target computing node, the bit mask in the small window of the packet sequence number table corresponding to the communication channel as a function of a packet sequence number of each of the plurality of out-of-order network packets received from the source computing node, wherein updating the bit mask in the packet sequence number table comprises:

determining, by the target computing node, whether a size of the bit mask is larger than a size of the small window;

allocating, by the target computing node and in response to a determination the size of the bit mask is larger than the size of the small window, a large window defining another portion of memory of the target computing node allocated to store the bit mask corresponding to a number of out-of-order network packets received by the target computing node through the communication channel, and wherein a size of the large window exceeds the size of the bit mask;

storing, by the target computing node, the bit mask in the large window; and storing, by the target computing node, a pointer to the large window in the small window.

16. The method of claim 15, further comprising:

receiving, by the target computing node, an additional out-of-order network packet;

updating, by the target computing node, the bit mask in the large window as a function of the received additional out-of-order network packet;

determining, by the target computing node, whether a size of the updated bit mask is larger than the size of the small window; and replacing, by the target computing node and in response to a determination the size of the updated bit mask is not larger than the size of the small window, the pointer to the large window with the updated bit mask.

17. The method of claim 16, further comprising freeing, by the target computing node and subsequent to the determination that no additional network packets are being tracked, the memory allocated to the large window.

18. The method of claim 16, further comprising marking, by the target computing node and subsequent to the determination that no additional network packets are being tracked, the large window as available and allocated to the source computing node.

19. The method of claim 15, wherein generating the entry comprises generating at least one of a connection state indicator to indicate whether the communication channel is active, an unordered packet sequence number indicator corresponding to a packet sequence number of the next expected network packet, and a window use indicator to indicate whether the small window corresponds to one of the bit mask or the pointer to the large window in which the bit mask is stored.

20. A target computing node for tracking out-of-order network packets, the target computing node comprising:
   network communication management circuitry to establish a communication channel with a source computing node via a network; and
   means for generating an entry of a packet sequence number table corresponding to the communication channel, wherein the entry includes a small window that defines a portion of memory of the target computing node allocated to store a bit mask corresponding to a number of out-of-order network packets received by the target computing node through the communication channel, wherein the number of out-of-order network packets represented by the bit mask corresponds to one or more out-of-order network packets whose corresponding sequence number exceeds an expected packet sequence number of a next in-order network packet expected to be received by the target computing node;
   wherein the network communication management circuitry is further to receive a plurality of out-of-order network packets from the source computing node via the communication channel, and
   further comprising means for updating the bit mask in the small window of the packet sequence number table corresponding to the communication channel as a function of a packet sequence number of each of the plurality of out-of-order network packets received from the source computing node, wherein the means for updating the bit mask in the packet sequence number table comprises means for (i) determining whether a size of the bit mask is larger than a size of the small window, (ii) allocating, in response to a determination the size of the bit mask is larger than the size of the small window, a large window that defines another portion of memory of the target computing node allocated to store the bit mask corresponding to a number of out-of-order network packets received by the target computing node through the communication channel, wherein a size of the large window exceeds the size of the bit mask, (iii) storing the bit mask in the large window, and (iv) storing a pointer to the large window in the small window.

21. The target computing node of claim 20, wherein the network communication management circuitry is further to receive an additional out-of-order network packet, and further comprising means for (i) updating the bit mask in the large window as a function of the received additional out-of-order network packet, (ii) determining whether a size of the updated bit mask is larger than the size of the small window, and (iii) replacing, in response to a determination the size of the updated bit mask is not larger than the size of the small window, the pointer to the large window with the updated bit mask.

* * * * *